Dec. 13, 1960 R. M. WILCOX 2,964,706
CONSTANT AMPLITUDE AUTO-SWEEP AND FREQUENCY METER CIRCUIT
Filed April 5, 1956 3 Sheets-Sheet 1
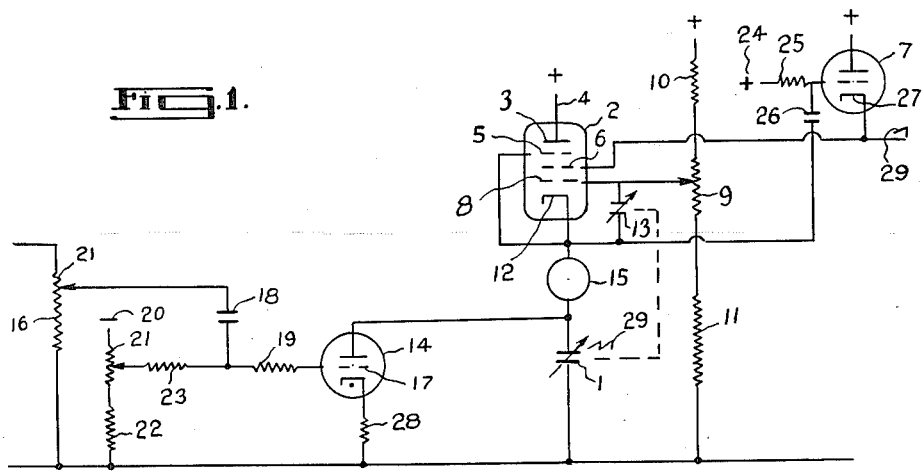
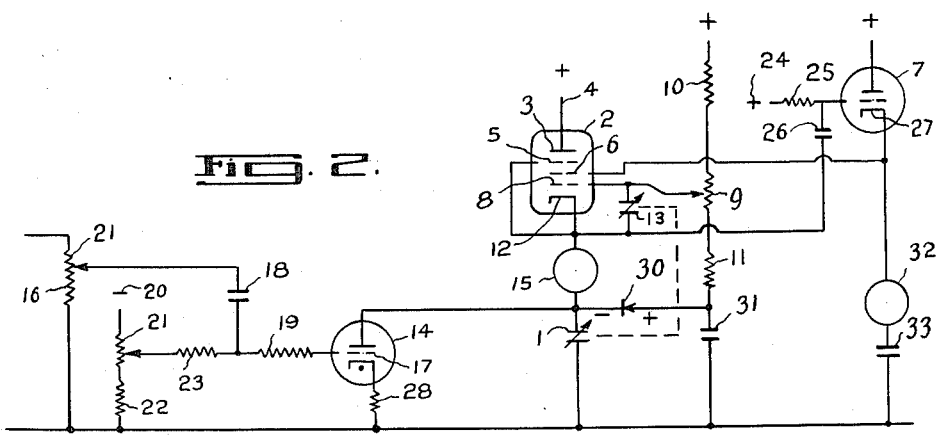
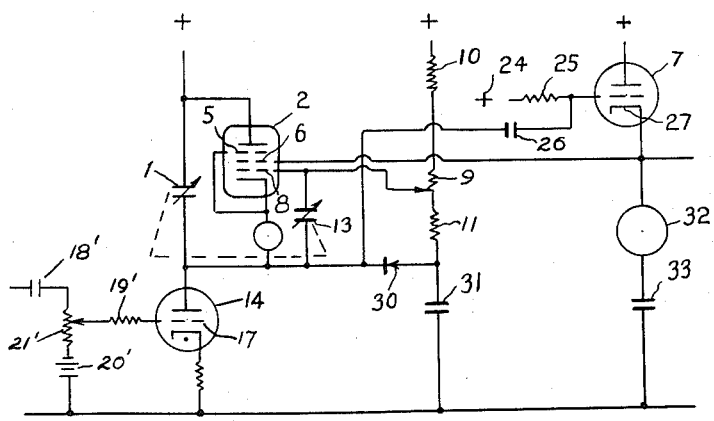
INVENTOR
ROY M. WILCOX
BY Douglas S. Johnson
ATTY.

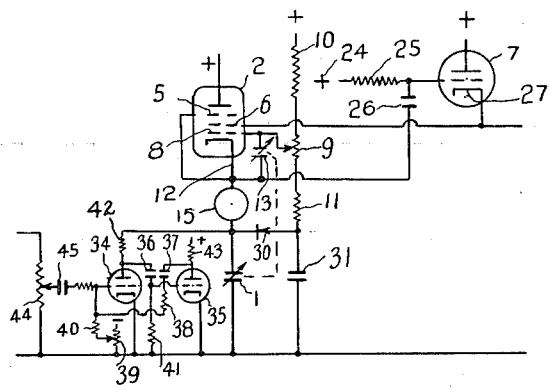

Dec. 13, 1960 R. M. WILCOX 2,964,706
CONSTANT AMPLITUDE AUTO-SWEEP AND FREQUENCY METER CIRCUIT
Filed April 5, 1956 3 Sheets-Sheet 3

INVENTOR
ROY M. WILCOX
By Douglas S. Johnson
ATTY.

United States Patent Office 2,964,706
Patented Dec. 13, 1960

2,964,706

CONSTANT AMPLITUDE AUTO-SWEEP AND FREQUENCY METER CIRCUIT

Roy M. Wilcox, South Bend, Ind.

Filed Apr. 5, 1956, Ser. No. 576,419

19 Claims. (Cl. 324—78)

This invention relates to sweep circuits, and more particularly to an improved constant amplitude sweep circuit.

The principal object of the invention is to provide a reliable and economical sweep device or circuit which will automatically synchronize with a recurring signal of any frequency over an extremely wide range and will provide a constant sweep amplitude independent of variations in the signal or its frequency.

Another important object is to provide a constant amplitude sweep circuit which will automatically lock into and maintain synchronism with weaker signals than previous devices or circuits of this nature without the use of auxiliary amplifying circuits and will provide a greater degree of constancy in sweep amplitude.

Another important object is to provide a slave sweep circuit of the type referred to which will permit convenient input coupling without the use of floating biases or other undesirable circuit connections.

A still further object is to provide a circuit arrangement in which variation in tube characteristics will be automatically compensated for to maintain sweep amplitude constancy.

It is still another and important object to provide a circuit which, while capable of sweeping, forms an accurate frequency meter of extremely simplified form.

Still another object of the invention is to afford a frequency meter that will measure the frequency of any wave form capable of synchronizing a sweep generator or circuit.

A specific use of my constant amplitude sweep circuit in the balancing of rotors is disclosed in my copending application Serial No. 166,901, filed May 31, 1950.

The principal feature of the invention resides in providing a sawtooth wave sweep circuit of the type having the flow of energy to and from an energy storage device or capacitor controlled by the use of a trigger circuit and a constant current device or tube, regulating respectively the front and slope of the saw-toothing sweep wave form, in which, in the case of a constant current tube, the cathode of the constant current tube is connected with one side of the capacitor while the grid is connected, for example, through an averaging circuit or other sawtooth wave isolating device to the opposite side of the capacitor whereby the grid bias of the constant current tube is varied in accordance with variations of the average charge on the capacitor in a manner to give automatic control of the average potential of the capacitor and hence of the sweep amplitude.

Another important feature resides in connecting the cathode of the constant current tube to the high side of the energy storage device or capacitor with its cathode floating and acting as a control element leaving the grid for use as a control element, and connecting the grid in a manner to form a control compensating for variations in the trigger circuit to maintain constancy of sweep amplitude independent of variations of the trigger circuit.

Another feature consists in utilizing as the constant current tube a pentode deriving its screen voltage through a cathode follower circuit connected with the pentode's cathode to permit the pentode's cathode to float without disturbing the pentode's constant current characteristic.

A still further and important feature consists in measuring current flow through the constant current tube, necessary to maintain the average potential on the energy storage device, as an accurate means of measuring the frequency of the trigger circuit or its triggering signal.

Referring to the accompanying drawings,

Figure 1 is a schematic diagram of a sweep circuit according to this invention.

Figure 2 is a schematic diagram of a somewhat modified form of circuit.

Figure 3 is a schematic diagram of a circuit embodying the invention but having the functions of the trigger tube and constant current tube reversed with regard to the charging and discharging of the energy storage condenser from the illustration of Figures 1 and 2.

Figure 4 is a further modified schematic diagram of the invention, showing an alternative trigger circuit for high frequency signals.

Figure 5 is a further modified schematic circuit illustrating the sweep amplitude control of the invention applied to a grounded pentode and floating trigger tube circuit.

Figure 6 is a diagrammatic redrawing of the trigger and constant current tube circuits of Figure 1 with the high A.-C. potential toward the top of the sheet.

Figure 7 is a diagram redrawn similar to Figure 6 but based on Figure 2.

Figure 8 is a diagram redrawn similar to Figures 6 and 7 but based on Figure 5.

Figures 6 to 9 are for purposes of explanation only.

Figure 9:
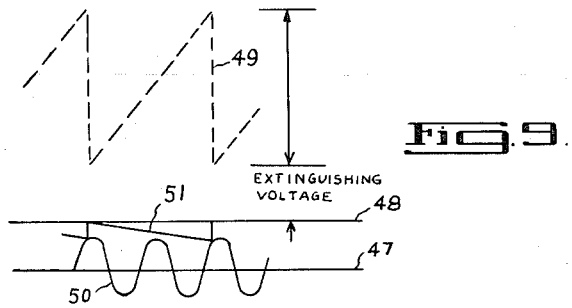
Figure 9 is a diagrammatic illustration illustrating the ability of the circuits Figures 1 to 4 to synchronize on weak signals.

Sweep generators employing an energy storage device and a charging and discharging circuit associated with such device for controlling accumulation and dissipation of charge have been used and United States Patent No. 2,448,069, August 31, 1948, to M. E. Ames, Jr., et al., discloses such a generator in which a constant current tube is employed while providing a constant sweep amplitude. However, such previous generators have experienced difficulty in providing coupling with an input signal requiring square wave generators or other undesirable input arrangements, which are expensive and not required according to this invention, and have further been unable to synchronize with weak signals.

It is an important concept of the invention to improve and simplify a constant amplitude sweep circuit and to provide at the same time an accurate inexpensive frequency meter capable of synchronizing with and measuring relatively weak signals.

Referring to the drawings, Figure 1 illustrates a circuit according to this invention comprising an energy storage device in the form of a variable condenser 1 in the cathode circuit of and adapted to be charged by the constant current pentode 2 having its plate 3 connected to a suitable unidirectional or D.-C. voltage source 4 represented throughout the circuits by a plus sign.

The suppressor grid 5 of tube 2 is connected to the cathode while screen 6 is also connected to the cathode through a cathode follower circuit including a triode 7.

The control grid 8 of tube 2 is connected to the variable voltage divider 9 in series with voltage dividers 10 and 11 connected between HT and ground and is also coupled to the cathode 12 by variable condenser 13.

Connected across condenser 1 is a thyratron 14 arranged to discharge the condenser alternatively with the charging action by pentode 2.

Arranged in the cathode circuit of tube 2 is a meter 15 which affords a precise measurement of frequency of the incoming signal as will hereinafter be explained.

The input signal to thyratron 14 is through an input amplitude control 16 coupled to the thyratron grid 17 through condenser 18 and grid current limiting resistor 19. The thyratron is provided with a grid bias 20 applied to the grid through the bias control 21 and voltage divider 22, resistor 23 serving to isolate the bias supply from the input signal.

The cathode follower circuit for pentode 2 derives its grid voltage for triode 7 from a fixed bias 24 through isolating resistor 25, and from the cathode of pentode 2 through coupling condenser 26 with the cathode 27 following the grid voltage and conected to screen 6 of tube 2.

The operation of circuit 1 is as follows: An input pulse or wave applied to the thyratron through condenser 18 and resistor 19 of sufficient amplitude to overcome bias 20 permits thyratron 14 to conduct discharging sweep condenser 1. Grid bias control 21 and bias 20 control the average grid voltage of the thyratron so that tripping occurs only on the positive peak of the incoming signal, and resistors 19 and 28 limit the instantaneous grid and cathode currents respectively.

Pentode 2 because of its plate current characteristics is continually charging the sweep condenser 1 at a fixed rate determined by its grid bias and this grid bias is varied by the value of the average charge on the condenser 1 to maintain the amplitude of the swing of the condenser voltage on charge and discharge to a constant value, the condenser voltage swinging or sweeping with a sawtooth wave form 29.

This control will be understood when it is appreciated that the average grid voltage of pentode 2 is fixed by the voltage dividers 9, 10 and 11 with respect to ground. The average grid bias of pentode 2 is thus determined by the average voltage of its cathode in respect to ground, regulating the voltage appearing across the condenser 13.

Since the sweeping of the condenser 1 is linear the average cathode voltage is equal to half of the sweep amplitude plus the cathode minimum which is essentially fixed in respect to ground at the minimum or extinguishing voltage of thyratron 14. Thus the cathode average potential and thus the grid bias depends essentially on the sweep amplitude. This grid bias in turn regulates the charging current in such a way as to correct change in sweep amplitude. For example, if sweep amplitude tends to increase, the average voltage of the cathode 12 of the constant current pentode will increase, providing an increase in the negative grid bias through the averaging circuit formed by condenser 13 and the voltage dividers 9, 10 and 11 to decrease flow through the constant current tube to decrease sweep amplitude to the value fixed by the setting of potentiometer 9. That is, while pentode 2 provides a plate current independent of plate voltage due to the presence of screen 6, this constant current characteristic will alter with change of grid bias as reflected upon change of cathode average voltage through the averaging circuit of condenser 13 and voltage divider 9.

Cathode follower 7 on the other hand permits screen 6 to float following the variation in cathode average voltage to maintain constant screen cathode potential, giving grid 8 full control of current flow.

A milliammeter 15 measuring the current flow through tube 2 provides an accurate measurement of the frequency of the incoming signal, for, as the frequency increases, decreasing the time that pentode 2 has to fill the condenser to provide the constant tube amplitude, the current of pentode 2 will increase correspondingly and reading of the cathode current will directly indicate the frequency increase.

It will be noted from Figure 1 that thyratron 14 is grounded facilitating input coupling. This grounding is permissible through the novel use of the cathode follower 7, permitting tube 2 to float while maintaining constant screen cathode potential and utilizing the cathode 12 as a control element relieving control grid 8 for compensation of variations in characteristics of thyratron 14, as will be understood in connection with Figure 2.

It will be noted that cathode 12 of the pentode is in D.-C. connection with the plate element of thyratron 14 and is also connected to one side of the condenser 1 while the control grid 8 of the pentode is in D.-C. connection with the opposite side of the condenser 1 through its averaging circuit. The sweep output, of constant amplitude independent of input frequency but synchronized by the input signal, is taken between ground and screen 6 of the pentode.

In the modified circuit of Figure 2 the cathode 12 of the pentode is connected to one side of the sweep condenser 1 while the control grid 8 is connected to the opposite side of the condenser 1 through the averaging circuit as formed by condenser 13, voltage dividers 9, 10, 11, rectifier 30 and thyratron 14.

The circuit 2 is a refinement over Figure 1 in that the grid voltage average of the pentode is thus fixed, not with respect to ground but with respect to the sweep minimum as determined by the thyratron 14. Thus variations in the minimum thyratron voltage will not affect the amplitude control which will maintain sweep constancy independent of the minimum of the sweep voltage.

Condenser 31 smooths current flow and ensures the grid voltage is fixed in respect to sweep minimum. As before, meter 15 measures the charging current to sweep condenser 1, and since the sweep voltage is linear and constant in amplitude by simple trigonometry the slope of the sweep voltage is proportional to frequency. This slope is the rate at which condenser 1 is being charged and hence the current being measured by the meter is proportional to sweep frequency and hence input signal frequency.

Figures 1 and 2 have the thyratron arranged to discharge the sweep condenser 1 and the constant current pentode as the charging device.

Figure 3 illustrates another circuit embodiment of the invention wherein the thyratron 14 forms the charging device and the pentode 2 forms the discharging device. The input to the circuit is through coupling condenser 18', grid bias control 21' for grid bias 20' through grid current limiting resistor 19'.

Firing of thyratron 14 grounds the sweep condenser 1 which then is discharged through pentode 2. The remainder of the circuit is similar to Figure 2.

Both Figures 2 and 3 provide an A.-C. volt meter 32 of a frequency independent type coupled between screen 6 of the pentode and ground through coupling condenser 33 to measure sweep amplitude.

The thyratron has certain disadvantages at extremely high frequencies and is therefore replaced by a conventional multi-vibrator circuit, as illustrated in Figure 4. The operation of this circuit, Figure 4, is the same as Figure 2, with the multi-vibrator circuit forming a trigger circuit to control charge on the sweep condenser 1 to provide the front of the saw tooth sweep voltage wave and the constant current pentode 2 controlling flow of charge on the sweep condenser to provide the slope of the sweep voltage wave.

The multi-vibrator circuit comprises a normally nonconducting tube 34 and a normally conducting tube 35. The plate of tube 34 is connected to the grid of tube 35 by a condenser 36, while the plate of tube 35 is connected to the grid of tube 34 by condenser 37 and isolating resistor 38.

The tube 34 is provided with a variable grid bias 39 through coupling resistor 40 and this bias is sufficient to maintain tube 34 cut off. Tube 35 obtains its bias through grid bias resistor 41 normally permitting the tube to conduct. The tubes 34 and 35 are also provided with plate-dropping resistors 42 and 43 respectively.

Upon an incoming signal from input amplitude control 44 coupled to the grid of 34 through condenser 45, tube 34 is operated to conduct to discharge sweep condenser 1, and the potential drop across resistor 42 is delivered through condenser 36 to the grid of tube 35 to cut off tube current flow. Condenser 36 and resistor 41 form a time delay circuit maintaining tube 35 cut off for a sufficient interval to permit sweep condenser discharge following which tube 35 again begins to conduct applying a negative pulse to cut off tube 34 through condenser 37.

It will be appreciated that other types of triggering circuits may also be employed.

Figure 5 depicts an alternative but not as satisfactory a sweep circuit. In this circuit the thyratron 14 is floating and the pentode 2 is grounded. The disadvantage of this circuit over the previous circuits is that the bias of both tubes is floating. With reference to the circuit particulars the input from potentiometer 16' is coupled to the grid of the thyratron through condenser 18' and resistor 19' with the plate of the thyratron connected to HT and the cathode connected to the high side of the sweep condenser 1. The grid bias 20' and isolating resistor 23' connected between the grid and cathode are floating. The pentode 2 is connected across the sweep condenser and has its cathode grounded with a frequency meter 15 in its cathode. In this case the screen 6 of the pentode is connected to a fixed potential. It will be noted, however, that the cathode of the pentode is connected on one side of condenser 1 while grid 8 is connected through the averaging circuit as formed by condenser 13, voltage divider 10' and fixed bias 46 (which may be made variable as a frequency control) to the opposite side of the sweep condenser.

While the circuit of Figure 5 is simpler than previous forms of constant sweep circuits, it has the inherent disadvantage of a floating grid bias and requiring of an input signal greater than the sweep amplitude to enable synchronism with the signal input.

Figures 6 to 8 illustrate in a diagrammatic form the essential novelty of the above circuits with only the trigger tube or thyratron, pentode and sweep condenser and essential components shown and with the high A.-C. potential towards the top of the sheet with common connection 52 A.-C. grounded.

Referring to Figure 6, it will be seen that the grid 8 of the pentode is connected through the averaging circuit formed by condenser 13, voltage divider 9 with the side of the sweep condenser 1, and is in D.-C. connection with the cathode of the thyratron 14. The cathode 12 of the pentode is connected to the opposite side of the sweep condenser 1. This circuit is equivalent to circuits of the type referred to in Figure 1.

Figure 7 shows the grid 8 of the pentode in D.-C. connection with the lower side of capacitor 1 through voltage divider 9, rectifier 30 and thyratron 14, this D.-C. relationship with capacitor 1 being maintained by capacitor 31 when the rectifier and thyratron cease conducting. Again, the other side of capacitor 1 is connected to the pentode cathode 12. This circuit is representative of the circuits Figures 2, 3 and 4.

Figure 8 representing Figure 5 again shows the grid connected through the averaging circuit formed by condenser 13 and resistor 10' with one side of condenser 1 while cathode 12 is connected to the opposite side of the condenser.

With the thyratron grounded according to Figures 1 to 4, Figure 9 represents the ability of the circuits to synchronize on weak signals.

The fixed grid bias 20 is represented by line 47 below ground potential line 48. Illustrated above the ground potential line is the sawtoothing plate voltage 49 of the thyratron 14. This voltage wave form has a minimum value as determined by the extinguishing voltage of the tube and a maximum value according to the setting of potentiometer 9. For the sake of consideration the cathode of the thyratron is considered as connected directly to ground. The incoming signal 50 alters the grid bias 47 as illustrated. Saw tooth wave 51 is the thyratron grid potential dependent on plate potential 49 above which the thyratron will fire, this being a characteristic of thyratrons.

Firing of the thyratron occurs whenever waves 50 and 51 meet. It can be seen from Figure 9 that by increasing the amplitude of the input wave slightly the thyratron will fire and the sweep will synchronize on every input wave instead of every second wave. Also, it can be seen that by raising bias potential 47 the same meeting of waves 50 and 51 and triggering of the sweep will occur with a very small input signal. This is possible because of the common or grounded relationship between the trigger tube or tubes and the signal source.

The ability to synchronize on weak signals therefore resides in the circuit arrangements permitting the cathode of the thyratron to be grounded.

Figure 10:
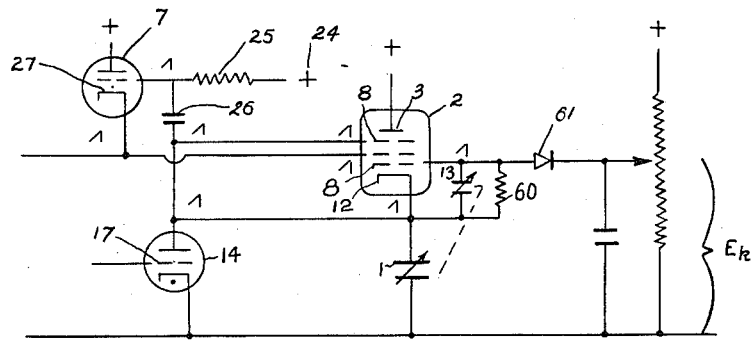
Figure 10 is a schematic circuit diagram illustrating another modified form of constant sweep circuit employing, according to a further aspect of my invention, a diode for effecting sweep amplitude control.

Referring to the modified form of circuit shown in Figure 10, all elements are the same as in Figure 1 except resistor 60, diode 61 and source $E_K$. The cathode follower has been moved from right to left on the page.

In the operation of the circuit of Figure 10, when the amplitude is too great, diode 61 conducts on the positive peak, thereby charging capacitor 13 and increasing the pentode negative grid bias. This reduces the charging current through the pentode to capacitor 1 and restores the sweep amplitude to normal. Resistor 60 is gradually tending to reduce the above grid bias and manages to do so whenever the sweep amplitude is too small to cause diode 61 to conduct thereby restoring the sweep amplitude to normal.

Obviously thyratron compensation can be applied to source $E_K$ as in the circuit of Figure 7 so as to make the pentode grid bias and sweep amplitude independent of the thyratron extinguishing potential $E_T$.

Figure 11:
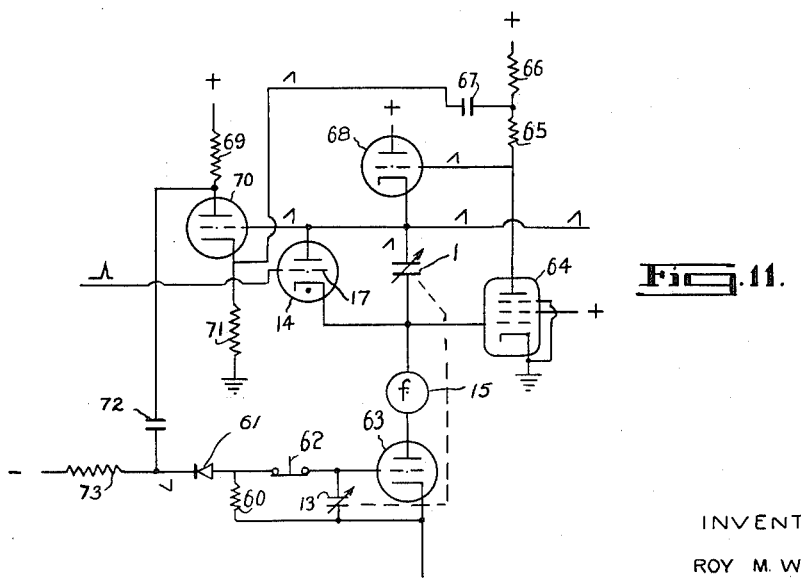
Figure 11 is a schematic circuit diagram illustrating still a further modified form of constant sweep circuit employing a diode control according to another aspect of my invention.

With reference to Figure 11, the invention is applied in conjunction with the use of a modified Miller circuit. In a conventional Miller circuit an amplitude controlling resistor would take the place of the frequency meter and tube 63. In the operation of such a circuit any change in the charging current during a single sweep would cause a change in voltage at the top end of such a resistor which would be amplified by pentode 64 causing a larger change in voltage across resistor 65. The latter change would affect the grid bias of tube 68 in the right sense to instantly restore the above charging current to normal. The triode 63 serves the same purpose as the conventional resistor.

Diode 61 and resistor 60 operate in essentially the same way as in Figure 10 to gradually change the amplitude controlling resistance of tube 63. If extreme linearity or more precise frequency measurement is needed push button 62 can be momentarily opened so that the resistance of tube or transistor 63 will be held precisely constant by the small charge on capacitor 13.

Tube 70 serves to invert the sawtooth wave so that when the positive peak at the sweep capacitor is abnormally high the cathode of diode 61 will be abnormally low so as to drive the grid of tube 63 more negative. This increases the resistance of tube 63 which brings the sweep amplitude back to normal through the chain of events described above.

The inverter would not be necessary except for the fact that resistor 73 and capacitor 72 should have a long-time constant which means that rapid changes in sweep frequency can not affect a change in the voltage across capacitor 72. Without the inverter 70 the diode 61 would be operating on the negative peak at the sweep capacitor 1 which is determined by the extinguishing potential of thyratron 14 and not by frequency. Therefore tube 63 would not sense a change in sweep amplitude caused by a change in frequency.

Resistor 66 serves to isolate the plate circuit of pentode 64 so that it can saw tooth with the cathode while controlling the bias of gate tube 68. The left side of capacitor 67 can be driven from the cathode of either inverter tube 70 or gate tube 68.

In Figure 10 when the frequency changes both the average cathode and average grid potentials change oppositely to provide a doubly effective control of sweep amplitude. On the other hand, in Figure 11 only the grid potential of tube 63 changes.

Diode conduction is on the positive peak in Figure 10 and negative peak in Figure 11 because in Figure 10 the saw tooth potential is on the anode side of the diode and in Figure 11 on the cathode side. That is because in Figure 10 the cathode of the amplitude controlling tube is sawtoothing whereas in Figure 11 it is not.

It is fundamental to both circuits of Figures 10 and 11 that the diode conduct away from the grid to establish a negative bias and so that resistor 60 can control in the opposite direction by draining capacitor 13.

It will be appreciated that in Figures 10 and 11 the diode 61 and oppositely leaking resistor 60 form a saw-tooth wave isolating device connected between the pentode grid and capacitor 1 and performing the grid bias control achieved with the averaging circuit of the embodiments of the invention illustrated in Figures 1 to 8.

A constant amplitude sweep circuit according to the invention may be used wherever an oscilloscope with a constant sweep amplitude is desirable and may be particularly applicable in the study of reciprocating engine parts because of the engine's varying speed and in vibration studies, measuring frequency, and hunting for resonant frequencies in mechanical structures, and in other time motion studies.

If desired the input signal can be disconnected from the sweep and the thyratron bias precisely regulated until the sweep is oscillating at a slightly differing frequency to or submultiple of the signal under observation, to operate as a sweep signal generator.

Obviously the sweep output signal if no current is required can be taken directly from the sweep capacitor 1 instead of through the cathode follower, to increase linearity.

In all circuits capacitors 1 and 13 are shown as variable in unison. These are stepped variations to provide frequency ranges on the meter scale. These changes in reactance also provide for a very wide range of frequencies without greatly changing the charging current or the number of cycles required for sweep amplitude correction as balanced against loss of linearity occurring when capacitor 13 is inadequate.

It will be understood that a suitable voltage amplifier, current amplifier, inverter or other device may be introduced between the source of the pentode grid signal and the grid if desired. Also, of course, with the expanding use of transistors, it will be understood that transistors may be employed in place of the tubes hereinbefore specified. The selection of such elements of course, will be to achieve functions corresponding to the functions of the present conventional tube elements as above described.

It will be appreciated that various other modifications in the actual circuit elements may be made without departing from the scope of the appended claims.

Throughout this specification it is to be understood that a D.-C. or fixed potential relationship to the minus, ground or neutral terminal of the electric source is also such a relationship to the plus terminal and vice versa.

What I claim as my invention is:

1. A constant amplitude sweep circuit comprising a condenser, a uni-directional voltage source for supplying a charge for said condenser, a trigger circuit, said trigger circuit having an input, across which an external sweep rate determinating alternating current signal is adapted to be connected, comprising a trigger control element and a ground connection, a circuit connecting said trigger circuit with said condenser to provide a rapid change of charge on said condenser, a constant current pentode, and a circuit connecting the cathode of said pentode to said condenser to provide energy flow in opposite direction to that afforded by said trigger circuit and circuit means comprising a capacitive connection between the cathode and control grid of said pentode next adjacent to said cathode to provide a grid bias for said pentode corresponding to average charge on said condenser, said grid bias acting to alter current flow through said pentode upon change of grid bias to maintain average charge on said condenser substantially constant to provide a substantially constant amplitude sweep voltage across said condenser independent of sweep rate.

2. In combination a condenser, means for alternatively charging and discharging said condenser and means responsive to the average charge on said condenser for varying the rate of charging or discharging of said condenser, said means including a constant current tube having a cathode in direct current connection with one side of said condenser and the control grid in direct current connection with the other side of said condenser, and an averaging circuit comprising a condenser connected between said cathode and grid and a source voltage dividing circuit to which said grid is connected at an intermediate point to provide grid bias on said tube varying in accordance with variations of average charge on said condenser to maintain a constant amplitude of charge variation on said condenser.

3. In combination a capacitor, a voltage source for charging said capacitor, a grounded trigger circuit and a floating constant current pentode circuit, said trigger circuit having a plate connection and said pentode circuit having a cathode connection with said capacitor and providing respectively a rapid and gradual change of charge on said capacitor, and condenser means connecting the cathode of said pentode with the pentode control grid to provide a grid bias responsive to average charge on said capacitor to control said floating constant current circuit to provide a current therethrough to maintain a constant average charge on said capacitor.

4. A constant sweep circuit comprising a source of voltage, a capacitor, means to charge said capacitor and means to discharge said capacitor to provide across said capacitor a saw tooth voltage wave having a step front and linear slope, one of said means forming a control for the slope of said saw tooth wave voltage comprising a pentode having a cathode connected to one side of said capacitor, a control grid next adjacent to said cathode capacitively coupled to said cathode, and a direct current circuit connecting said grid to the opposite side of said capacitor, and the other of said means comprising a trigger circuit connected between said capacitor and ground and responsive to recurring input signals to synchronize said saw tooth voltage with said signals to provide a repetition sweep rate corresponding to the frequency of an input signal.

5. A constant sweep circuit comprising a source of voltage, a capacitor, means to charge said capacitor and means to discharge said capacitor to provide across said capacitor a saw tooth voltage wave having a stepped front and linear slope, one of said means forming the slope of said saw tooth voltage wave comprising a pentode having a cathode connected to one side of said capacitor and a control grid next adjacent to said cathode, a condenser coupling said grid to said cathode, and a voltage divider connected with said grid to maintain a constant average grid voltage, and the other of said means comprising a trigger circuit, said trigger circuit having an input, across which an external sweep rate determinating alternating current signal is adapted to be connected, comprising a trigger control element and a ground connection.

6. A constant amplitude sweep circiut comprising a voltage source, a sweep condenser having one plate at a fixed potential, a pentode interposed between said source and the other plate of said condenser and having its cathode connected to said other plate to provide current flow thereto and having a control grid next adjacent to said cathode and a screen and a condenser coupling said cathode to said grid, a voltage divider supplying said control grid with a substantially constant average grid voltage, a cathode follower circuit connecting said screen and cathode, a trigger circuit connected between said pentode cathode and ground to conduct away charge delivered by said pentode to said condenser.

7. A constant amplitude sweep circuit comprising a voltage source, a condenser having one plate at a fixed potential, a pentode interposed between said voltage source and the other plate of said condenser and having its cathode connected to said other plate to provide current flow thereto, a trigger tube connected between said pentode cathode and ground, said pentode having a control grid next adjacent to its cathode capacitively coupled to its cathode and a screen, a cathode follower circuit connecting said cathode and screen, and a voltage dividing circuit applying a fixed voltage to said pentode control grid.

8. A device as claimed in claim 7, in which said voltage dividing circuit includes a potentiometer connected to said pentode grid to alter applied grid voltage to regulate pentode current flow, thereby regulating amplitude of charge variation on said condenser.

9. In combination a voltage source, a condenser having one plate at a fixed potential, a pentode interposed between said source and the other plate of said condenser and having its cathode connected to said other plate to provide current flow thereto to vary the charge on said condenser gradually, a trigger tube connected between said pentode cathode and ground to vary the charge on said condenser rapidly to provide a saw tooth voltage across said condenser at the frequency of said trigger tube, an input circuit for said trigger tube to trigger said tube at a frequency corresponding to the frequency of an applied recurring signal, said pentode having a control grid next adjacent to its cathode capacitively coupled to its cathode and a screen, a cathode follower circuit connecting said cathode and screen, a voltage dividing circuit applying a fixed grid voltage to said pentode control grid while permitting a grid bias corresponding to an average potential of said cathode to control pentode current flow in a manner to maintain a substantially constant cathode average voltage and hence substantially constant amplitude of voltage variation across said condenser, and a direct current meter connected in series with said pentode to measure current flow to maintain average condenser charge as a measure of the frequency of an input recurring signal.

10. In combination a voltage source, an energy storage device, a trigger circuit and constant current tube connected with said storage device and source and controlling flow of energy to and from said energy storage device to provide a saw tooth wave form across said storage device, said trigger circuit having an input, across which an external sweep rate determinating alternating current signal is adapted to be connected, comprising a trigger control element and a ground connection, said constant current tube having a cathode in connection with one side of said energy storage device and a control grid next adjacent to said cathode, an averaging circuit including capacitive means connecting said cathode and grid and means providing a connection between said grid and the opposite side of said energy storage device, and a D.-C. meter in series with said constant current tube.

11. The combination of a condenser, a uni-directional voltage source for supplying a charge for said condenser, a grounded input trigger circuit adapted to synchronize with an input recurring signal, a circuit connecting said trigger circuit with said condenser to provide a rapid change in charge on said condenser at the frequency of an input signal, a constant current pentode and a circuit connecting the cathode of said pentode to said condenser to provide energy flow in a direction opposite to flow provided by said trigger circuit and circuit means including a capacitive connection between said cathode and the next adjacent control grid of said pentode and a voltage divider circuit connected to said control grid and ground through said trigger circuit for establishing a grid bias for said pentode corresponding to average charge on said condenser, said grid bias acting to alter current flow through said pentode upon change of grid bias average under change of frequency of an incoming signal to maintain average charge on said condenser substantially independent of signal frequency, and a meter measuring current through said pentode to maintain said average charge as a measure of signal frequency.

12. The combination as claimed in claim 11, in which a uni-directional device is connected between said pentode control grid and trigger circuit to compensate for variations in said trigger circuit.

13. A constant amplitude sweep circuit comprising a voltage source, a condenser having a pair of plates, one of said plates being at a fixed potential, a pentode interposed between said voltage source and the other of said plates and having a cathode connected to said other plate to provide current flow thereto to provide a gradual change in charge on said condenser, a trigger tube connected between said pentode and ground and adapted to synchronize with an incoming recurring signal to provide a rapid change in charge on said condenser at the frequency of an incoming signal, said pentode having a control grid next adjacent to said cathode capacitively coupled to its cathode and a screen, a cathode follower circuit connecting said cathode and screen, a voltage divider connected with said grid, and a uni-directional device connecting said grid to ground through said trigger tube.

14. A constant amplitude sweep circuit having an input controlled sweep rate comprising an electric source, a capacitor, an externally controlled trigger circuit having an input connection between a trigger circuit controlling element and ground, and a floating constant current pentode, said trigger circuit and the cathode of said pentode having a common circuit connection to one side of said capacitor, such that either of said trigger circuit and pentode is adapted to fill said capacitor from said source, and the other is adapted to empty said capacitor, and circuit means supplying a bias to said pentode in accordance with the average charge on said capacitor to regulate current flow through said pentode.

15. A constant amplitude sweep circuit having an input controlled sweep rate comprising an electric source, a capacitor, an externally controlled trigger circuit comprising a thyratron provided with a control grid and having an input connection between said grid and ground, and a floating constant current pentode, the plate of said thyratron and the cathode of said pentode having a common circuit connection to one side of said capacitor whereby either of said thyratron and pentode is adapted to fill and the other to discharge said capacitor, and circuit means supplying a bias to said pentode in accordance with the average charge on said capacitor to regulate current flow through said pentode.

16. A circuit as claimed in claim 14 in which said trigger circuit comprises a multivibrator circuit.

17. A circuit as claimed in claim 14 in which the cathode of said pentode is connected to the screen of the pentode through a cathode follower.

18. A constant amplitude sweep circuit comprising an electric source, a capacitor, a thyratron provided with a control grid and having an input connection between said control grid and ground, said capacitor being connected between the plate of said thyratron and ground, a floating constant current pentode connected between said source and the side of said capacitor connected to said thyratron plate, said capacitor being connected through an averaging circuit with the control grid of said pentode and including a capacitive connection between the pentode cathode and said pentode control grid to regulate pentode current in accordance with average charge on said capacitor, and the cathode of said pentode being connected to the pentode screen through a cathode follower.

19. In combination a uni-directional voltage source, a sweep capacitor, an electronic trigger amplifier having at least three elements in which two elements control the current through the remaining elements and an electronic constant-current amplifier having more than two elements in which two elements control the current through the remaining elements, said amplifiers being connected with said sweep capacitor and said source and controlling energy to and from said sweep capacitor to provide a sweep wave form across said capacitor in step with a repetitive input signal to said trigger amplifier, said trigger amplifier having one control element at A.-C. ground potential, said constant-current amplifier having one control element in connection with one side of said sweep capacitor and the other control element in connection with the other side of said sweep capacitor through a sweep wave impeding circuit and an amplitude controlling bias and said constant-current amplifier having a capacitor connected between its control elements.

References Cited in the file of this patent

UNITED STATES PATENTS

| | | |
|---|---|---|
| 2,448,070 | Sunstein | Aug. 31, 1948 |
| 2,453,787 | Downs | Nov. 16, 1948 |
| 2,480,599 | Oxford | Aug. 30, 1949 |
| 2,519,057 | Luck | Aug. 15, 1950 |
| 2,522,957 | Miller | Sept. 19, 1950 |
| 2,602,890 | Gaines | July 18, 1952 |
| 2,627,025 | Trembly | Jan. 27, 1953 |
| 2,645,715 | Weller | July 14, 1953 |
| 2,661,420 | Woodruff | Dec. 1, 1953 |
| 2,662,981 | Segerstrom | Dec. 15, 1953 |
| 2,743,357 | Casey | Apr. 24, 1956 |
| 2,824,962 | Wise | Feb. 25, 1958 |